(12) United States Patent
Monai et al.

(10) Patent No.: US 7,301,937 B2
(45) Date of Patent: Nov. 27, 2007

(54) SYSTEM FOR AUTOMATICALLY SELECTING VOICE DATA TRANSMISSION AND RECEPTION SYSTEM FOR IP NETWORK, METHOD THEREOF, AND IP TERMINAL

(75) Inventors: Nobuhiro Monai, Kawasaki (JP); Yoshikazu Kobayashi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 805 days.

(21) Appl. No.: 10/654,128

(22) Filed: Sep. 4, 2003

(65) Prior Publication Data

US 2005/0099996 A1 May 12, 2005

(30) Foreign Application Priority Data

Nov. 29, 2002 (JP) ............................. 2002-348065

(51) Int. Cl.
*H04L 12/66* (2006.01)
(52) U.S. Cl. ..................... 370/352; 370/401; 370/351
(58) Field of Classification Search ................ 370/352, 370/466, 260, 261, 355, 228, 351, 401
See application file for complete search history.

(56) References Cited

U.S. PATENT DOCUMENTS 6,334,124 B1  12/2001  Bouchard et al.
7,167,486 B2 *  1/2007  Cornelius et al. ........... 370/467

FOREIGN PATENT DOCUMENTS

| JP | 8-65343 | 3/1996 |
|---|---|---|
| JP | 2000-59415 | 2/2000 |
| JP | 2000-349821 | 12/2000 |
| JP | 2001-177557 | 6/2001 |
| JP | 2001-177661 | 6/2001 |
| JP | 2001-223748 | 8/2001 |
| JP | 2002-9846 | 1/2002 |
| JP | 2002-185515 | * 6/2002 |
| WO | WO 02/25451 | 3/2002 |

\* cited by examiner

*Primary Examiner*—Melur Ramakrishnaiah
(74) *Attorney, Agent, or Firm*—Young & Thompson

(57) ABSTRACT

Voice is input to a voice input and output portion 11. Thereafter, a digital-analog portion converts analog signal of voice into digital data. An RTP port confirming portion confirms whether or not a communication according to the RTP can be made. When the communication according to the RTP cannot be made, with reference to a history table, a port through which a voice data communication can be made is determined. Digitized voice is sent to a call controlling portion. The call controlling portion performs a call control for the voice communication. When the communication according to the RTP can be made, the voice data is sent to an IP communication portion. The IP communication portion paketizes the voice data. Packetized voice data according to the IP is sent to a LAN interface portion. The LAN interface portion outputs the packetized voice data to a network.

10 Claims, 10 Drawing Sheets

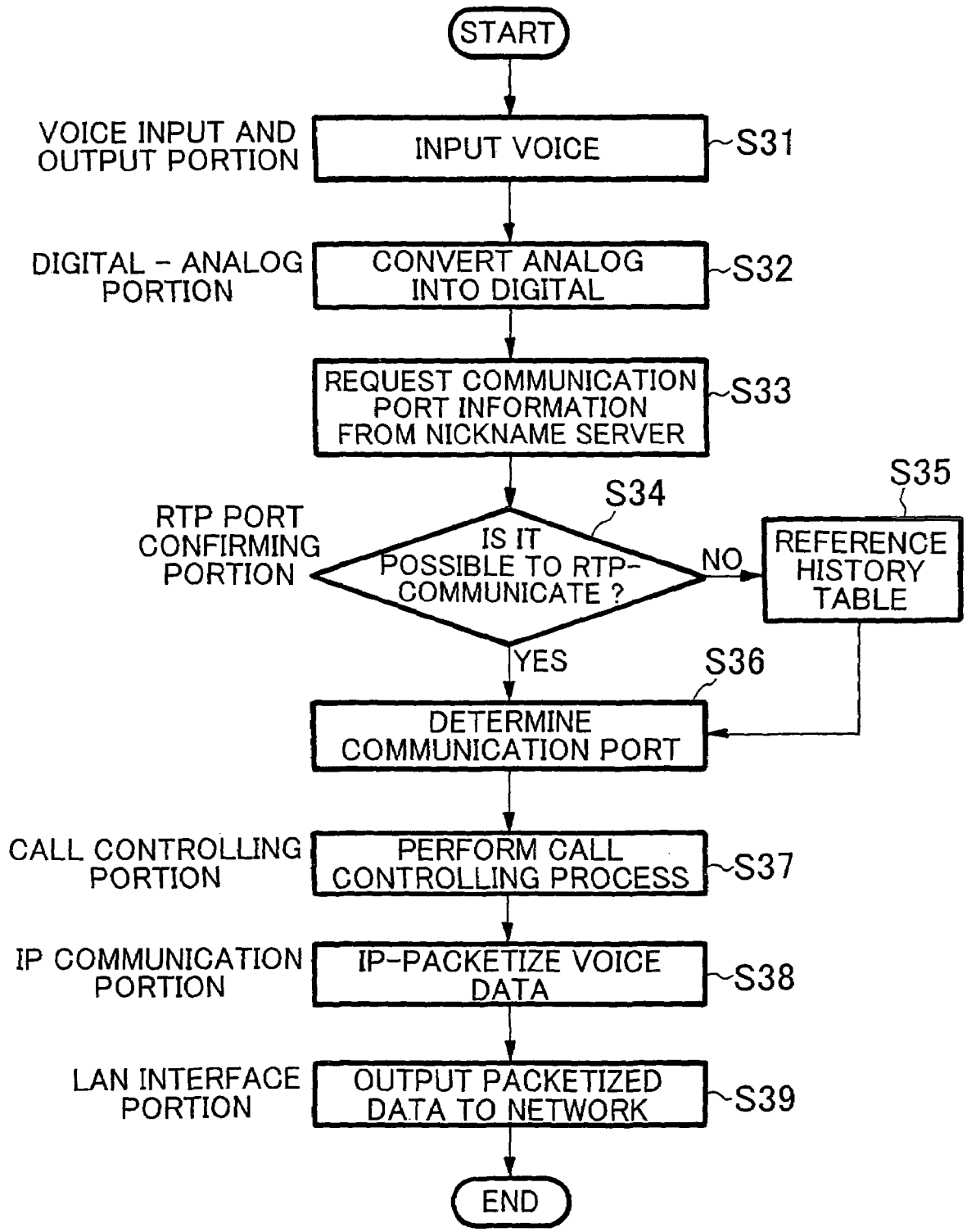

SYSTEM FOR AUTOMATICALLY SELECTING VOICE DATA TRANSMISSION AND RECEPTION SYSTEM FOR IP NETWORK, METHOD THEREOF, AND IP TERMINAL

BACKGROUND OF THE INVENTION

1. Field of the Invention

The present invention relates to a system for automatically selecting a voice data transmission and reception system that allows the voice data transmission and reception system on an IP (Internet Protocol) network to be switched without necessity for the user to consider the state of the network.

2. Description of the Related Art

Conventionally, in a VoIP (Voice over Internet Protocol) system that transmits and receives voice on an IP network, communications according to the RTP (Real-time Transport Protocol) are known. The RTP is used as a transport layer protocol that accomplishes a real-time application especially through a network such as a video conference system and an Internet telephone. In the RTP, through an RTP port designated on a control channel (for example, sip port=5060), voice and a moving picture are transmitted and received in real time.

Generally, on an IP network in which a firewall is disposed between a LAN and the Internet, only IP port numbers used in predetermined protocols such as HTTP, FTP, and SMTP are permitted to be connected. The other port numbers are prohibited from being connected.

Each IP port number is represented by a two-octet positive number, which ranges from 0 to 65535. An application using an IP network communicates through one of these IP ports. Normally, each application is assigned one of the following IP port numbers.

WELL KNOWN PORT NUMBERS=0 to 1023

These port numbers are used for system (or route) processes of most systems and for programs of privileged users. Typical examples are ftp=21, http=80, etc.

REGISTERED PORT NUMBERS=1024 to 49151

These port numbers are used for general user processes of most systems and for programs executed by general users. Typical examples are call-sig-trans (H.323 AnnexE)=2517, sip=5060, etc.

DYNAMIC AND/OR PRIVATE PORTS=49152 to 65535

These port numbers can be freely used by users. Normally, VoIP control protocols such as H.323 and SIP provide RTP ports in this range and connect communication ports therethrough.

A firewall filters unnecessary IP ports of these ports so as to prevent external harmful attacks in advance. In particular, the DYNAMIC AND/OR PRIVATE PORTS are ports that tend to be filtered. On the other hand, generally, for a network access, at least http port (=80) is reserved.

To perform an IP voice communication through any port number in such a system, a system structure in which a multimedia proxy server is disposed has been disclosed (for example, refer to Patent Document 1).

In addition, an IP wireless phone technology for accessing an IP network through a wireless LAN or a PHS (Personal Handy-phone System) data communication network and for performing an IP voice communication has been disclosed (for example, refer to Patent Document 2).

[Patent Document 1]
Japanese Patent Publication No. 2002-9846-A
[Patent Document 2]
Japanese Patent Publication No. 2001-223748-A However, in a conventional VoIP system, a communication according to RTP or another voice data transmitting and receiving method should be preset. In other words, it was impossible automatically to determine whether or not a voice data communication according to the RTP can be made and switch to a proper communication system.

SUMMARY OF THE INVENTION

Therefore, an object of the present invention is to provide a system for automatically selecting a voice data transmission and reception system for an IP network, a method thereof, and an IP terminal that allow it to determine whether or not a communication according to the RTP can be made and a voice data transmission and reception system to be selected according to the state of the network.

To solve the foregoing problem, the present invention is a system for automatically selecting a voice data transmission and reception system for an IP network on which an IP terminal is connected to a called party's terminal through a firewall, wherein the IP terminal comprises: a call controlling portion for processing a VoIP (Voice over Internet Protocol) control signal; a voice input and output portion for inputting and outputting a voice and moving picture; a digital and analog process portion for performing a digital and analog converting process for the input voice and moving picture; an IP communication portion for transmitting the voice and moving picture according to the IP; an RTP port confirming portion for confirming whether or not a communication according to the RTP can be made; and a history table on which communications made through the firewall are recorded, wherein the RTP port confirming portion is configured to confirm whether or not the communication according to the RTP can be made, wherein when the communication according to the RTP can be made, an RTP port is used and voice data is sent to the IP communication portion so as to packetize the voice data for the communication according to the RTP, and wherein when the communication according to the RTP cannot be made, with reference to the history table, a port through which the voice data communication can be made is determined and the voice data is sent to the IP communication portion.

The RTP port confirming portion is configured to send a search packet so as to confirm whether or not a communication can be made through a predetermined RTP port, wherein when a response to the search packet is received, it is determined that the communication can be made and voice data according to the RTP is transmitted and received.

With the foregoing structure, even if a firewall is disposed, it can be automatically determined whether or not voice data according to the RTP can be transmitted and received.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 10 is a flow chart showing an operation in the case that the nickname server and the history table are used.

DESCRIPTION OF PREFERRED EMBODIMENTS

Next, with reference to the accompanying drawings, an embodiment of the present invention will be described.

Figure 1:
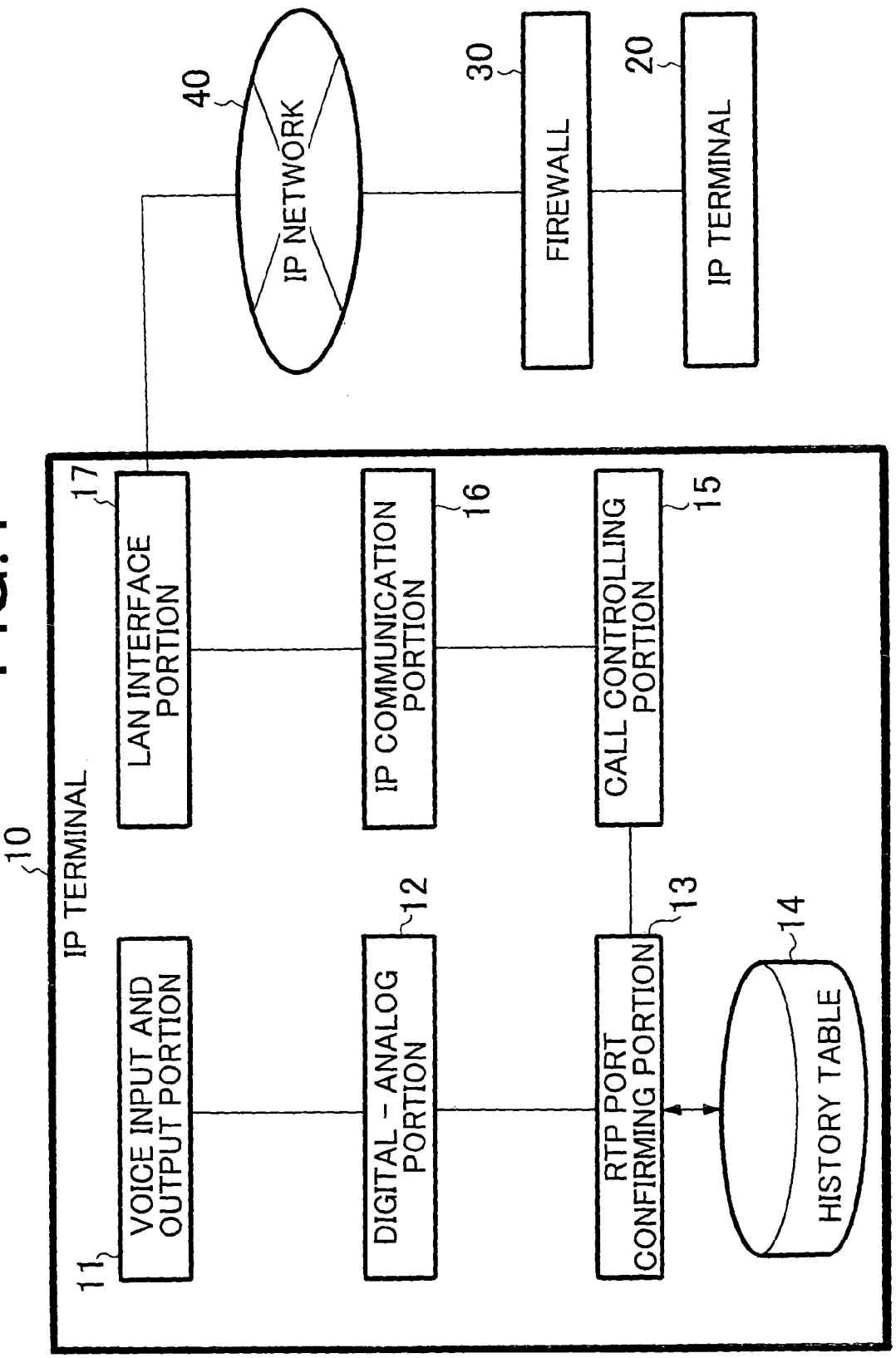
FIG. 1 is a schematic diagram showing the structure of a system for automatically selecting a voice data transmission and reception system according to the present invention.

FIG. 1 shows an example of the structure of a system for automatically selecting a voice data transmission and reception system according to the present invention. In a system that an IP terminal 10 and an IP terminal 20 perform a voice data communication through a firewall 30 and an IP network 40, the IP terminal 10 has a voice input and output portion 11 that inputs and outputs voice and a moving picture, a digital and analog process portion 12 that performs a digital-analog converting process for the input voice and moving picture, an RTP port confirming portion 13 that confirms whether or not a communication according to the RTP can be performed, a history table 14 in which data communications that were through the firewall are recorded, a call controlling portion 15 that processes a control signal according to the VoIP, an IP communication portion 16 that transmits and receives voice and a moving picture data according to the IP, and a LAN interface portion 17 that inputs and outputs data to and from the network.

Next, with reference to a flow chart shown in FIG. 2, an operation of the present system will be described. First of all, voice is input to the voice input and output portion 11 (at S1). Thereafter, the digital-analog portion 12 converts analog signal of voice into digital data (at S2). The RTP port confirming portion 13 confirms whether or not a communication according to the RTP can be made (at S3). When the communication according to the RTP can be made, an RTP port is used. When the communication according to the RTP cannot be made, with reference to the history table 14, a port through which a voice data communication can be made is determined (at S4). Digitized voice is sent to the call controlling portion 15. The call controlling portion 15 performs a call control for a voice communication (at S5). In addition, the voice data is sent to the IP communication portion 16. When the communication according to the RTP can be made, the IP communication portion 16 packetizes the voice data. When the communication according to the RTP cannot be made, the IP communication portion 16 references the history table and packetizes the voice data according to a protocol (for example, HTTP) corresponding to the determined port (at S6). The packetized voice data according to the IP is sent to the LAN interface portion 17. The LAN interface portion 17 outputs the packetized voice data to the network (at S7).

Figure 2:
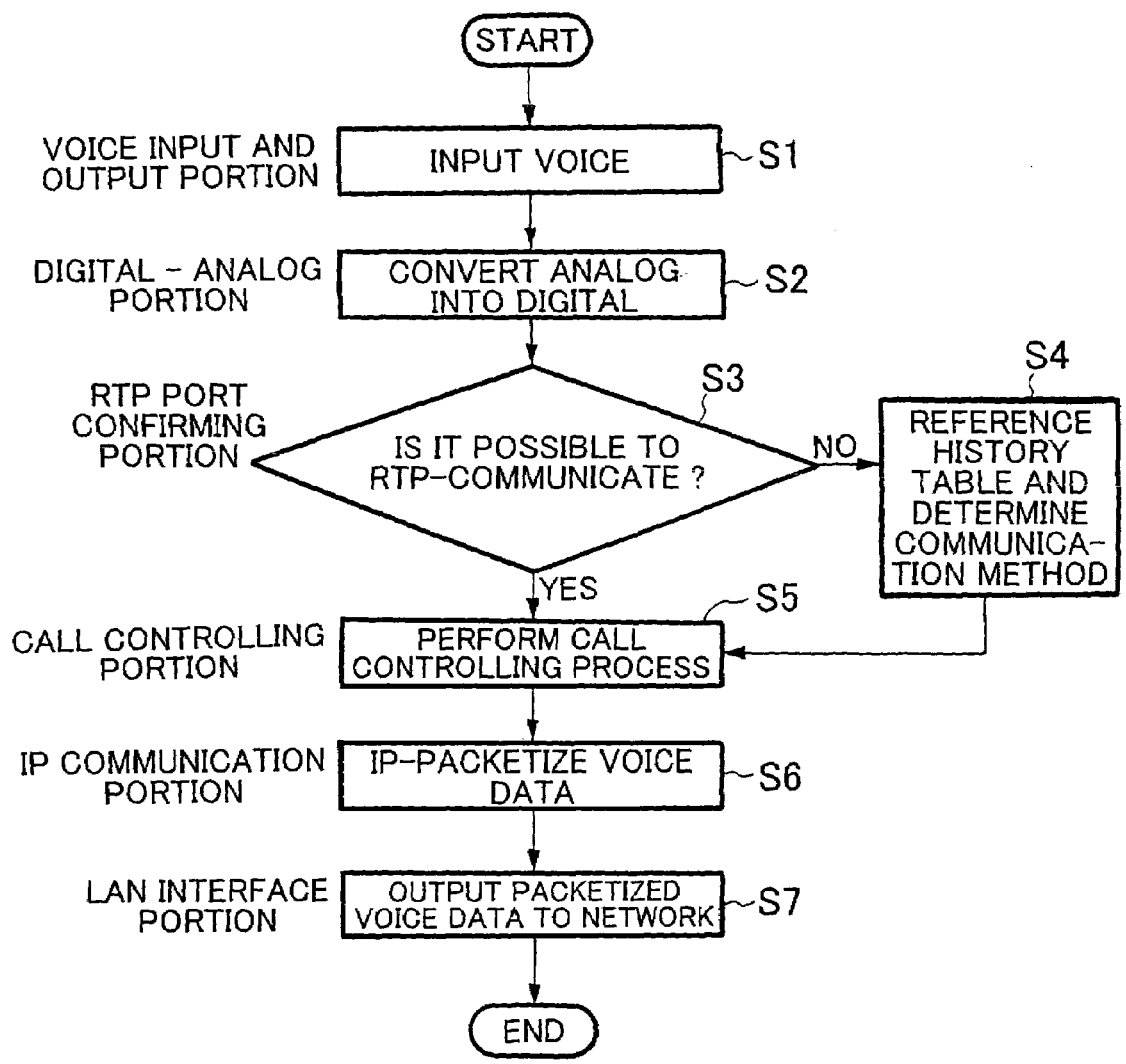
FIG. 2 is a flow chart describing an operation of the present invention.
Figure 3:
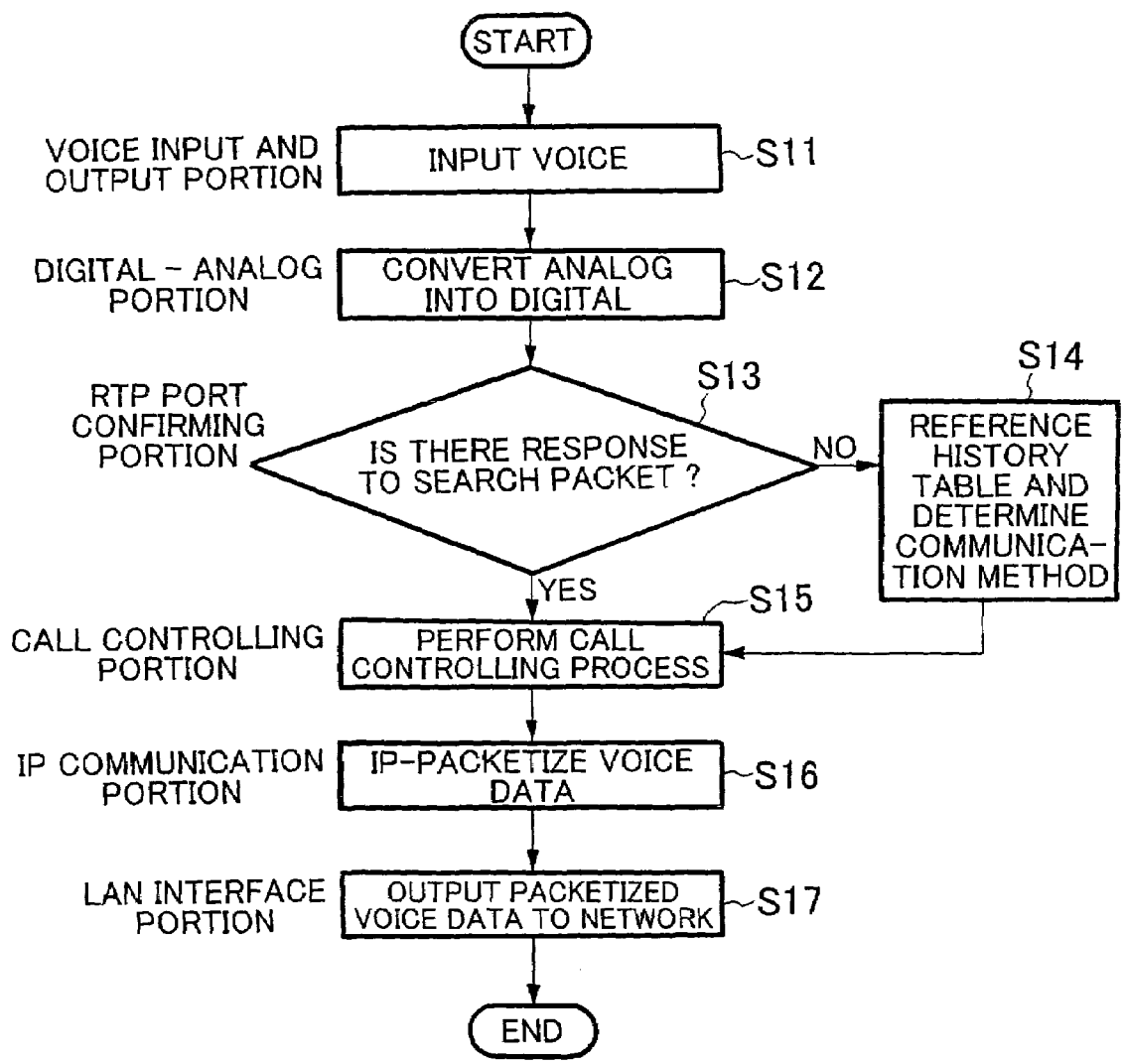
FIG. 3 is a flow chart describing an operation for transmitting a search packet so as to confirm a port.

When it is confirmed whether or not the communication according to the RTP can be made (at S3) in the flow chart shown in FIG. 2, a search packet is transmitted so as to confirm whether or not a communication can be made through a predetermined RTP port. FIG. 3 is a flow chart showing an operation in the case that such a search packet is transmitted. When a response to the search packet is received, it is determined that a communication can be made (at S13). As a result, voice data according to the RTP can be transmitted and received. The flow chart shown in FIG. 3 is the same as the flow chart shown in FIG. 2 except for step S13.

As a search packet, for example, ping of ICMP (Internet Control Message Protocol) is used. In other words, a calling party's IP terminal sends Echo Request to a called party's terminal. The called party's terminal sends back Echo Replying to the calling party's IP terminal. When there is no response to ping that the calling party's IP terminal sent, it is determined that a communication cannot be made through the RTP port.

When a communication cannot be made through a known port, voice data cannot be transmitted and received. Thus, according to the present invention, with the history table 14 in which data communications are recorded, a communication port through which a data communication to the called party can be made is automatically selected. Through the selected communication port, data can be transmitted and received to and from the called party. In the history table 14, port numbers are recorded in the order of communication dates and times. In addition, in the history table 14, the numbers of times communications to the port numbers have been successful are recorded. Among these ports, one port having a possibility of which a communication can be made is selected and voice data is transmitted and received therethrough.

Figure 4:
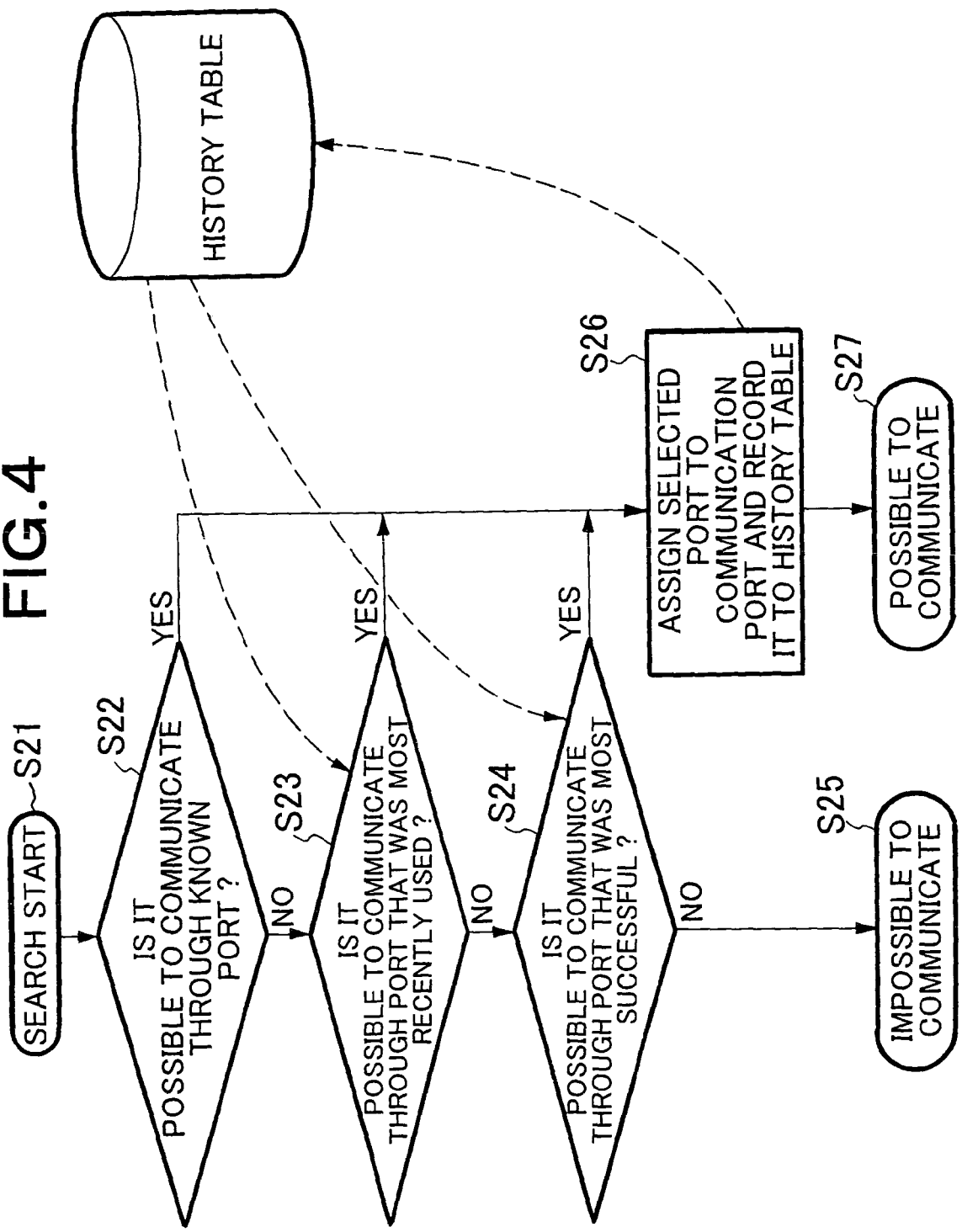
FIG. 4 is a flow chart showing an operation using a history table.

FIG. 4 is a flow chart showing an operation in the case that the history table is used. A search packet is sent so as to confirm whether a communication can be made through a known communication port (at S21). When a communication can be made through a known communication port (at S22), the port is assigned to a communication port and recorded in the history table (at S26). When a communication cannot be made through a known port, if there are a plurality of records of the communication ports in the history table, a communication port that was most recently used and successful is selected as a first candidate for communication port from a plurality of records of the history table (at S23). When a communication cannot be made through the selected port, communication ports through which many communications were successfully made are selected (at S24). The selected ports through which communications can be made are assigned to communication ports and recorded in the history table (at S26). In the foregoing manner, the calling party's IP terminal is connected to a port having a possibility of which a communication can be made so that voice data can be transmitted and received.

Figure 5:
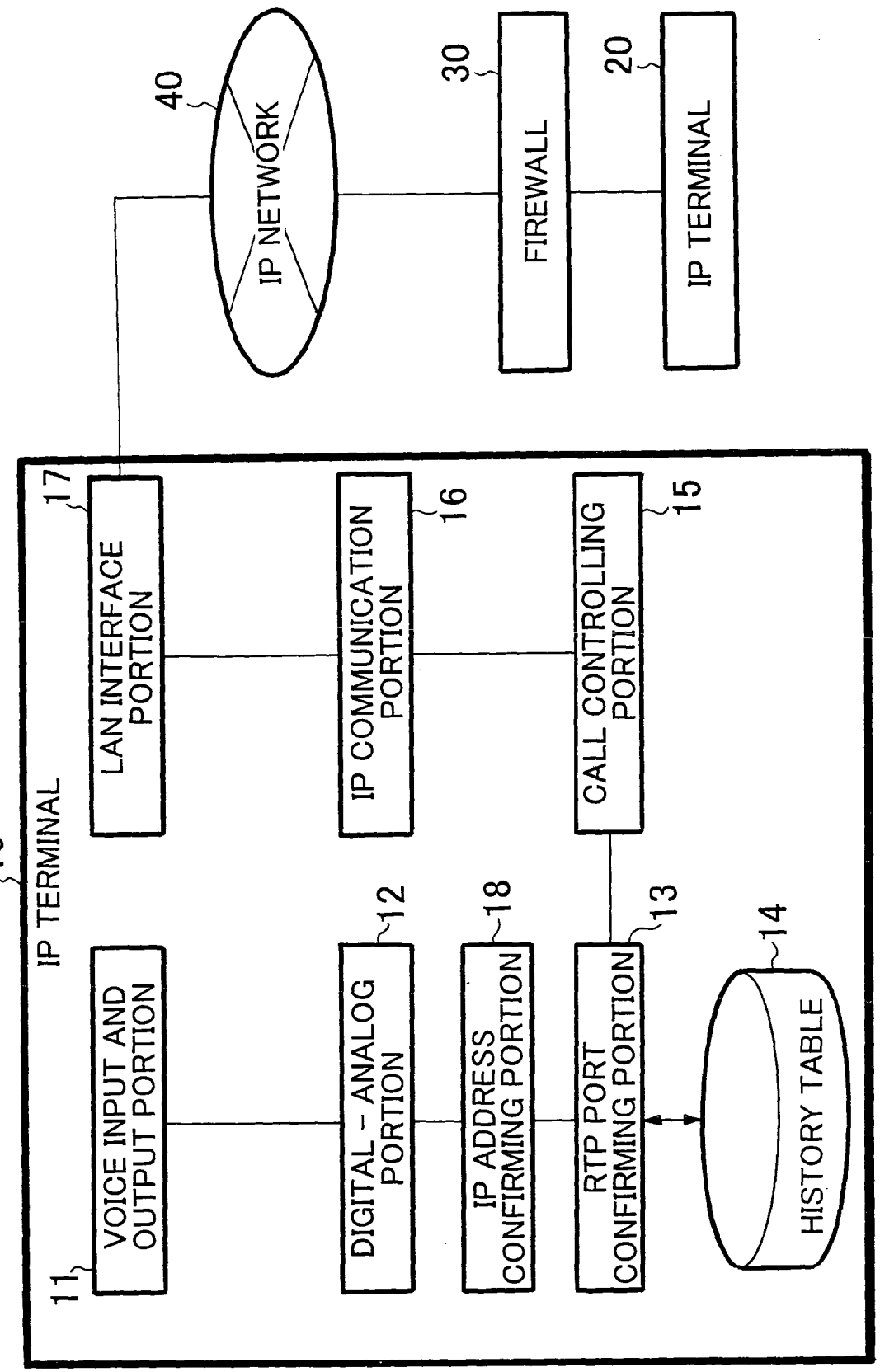
FIG. 5 is a schematic diagram showing the structure of an IP terminal that has an IP address confirming portion.

FIG. 5 shows the structure of an IP terminal that has an IP address confirming portion 18. The IP address confirming portion 18 confirms an IP address of a calling party's IP terminal and an IP address of a called party. When the calling party's IP terminal and the called party's terminal have been assigned private IP addresses, the IP address confirming portion 18 confirms that they are on the same network and that voice data according to the RTP is properly transmitted and received. Thus, voice data can be transmitted and received with high communication efficiency without necessity of user's consideration against the state of the network.

Figure 6:
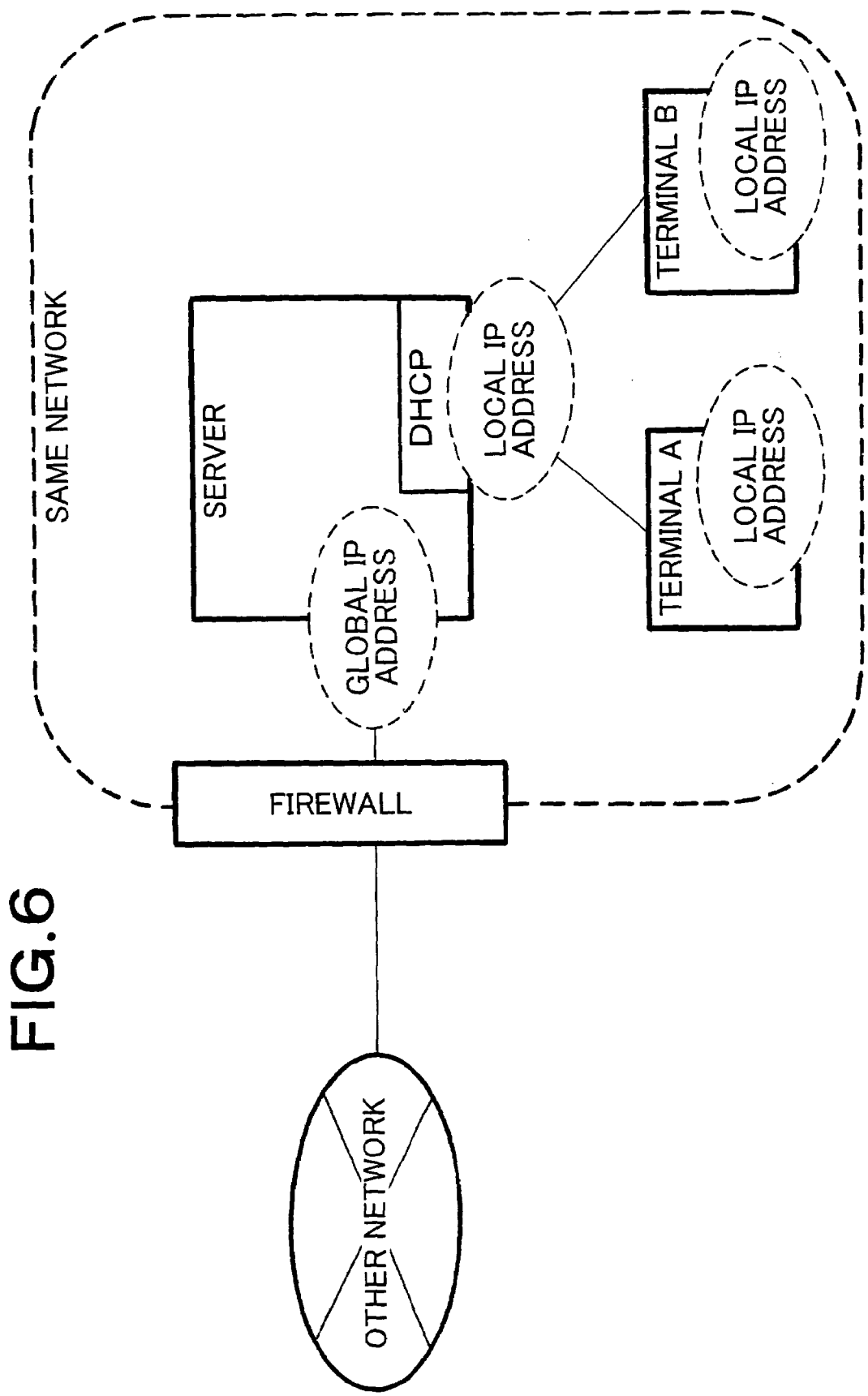
FIG. 6 is a schematic diagram showing the structure in the case that a calling party's terminal and a called party's terminal are disposed on the same network.

FIG. 6 shows an example of the structure in the case that a calling party's terminal and a called party's terminal have private (local) IP addresses on the same network. In this case, on the same network, local IP addresses are used. When a communication is made to another network through the firewall, a DHCP (Dynamic Host Configuration Protocol) server is used. The DHCP server converts a local IP address into a global IP address. Since the terminal A and the terminal B are on the same network, voice data according to the RTP can be properly transmitted and received therebetween not through the firewall.

Next, with reference to FIGS. 7, 8, and 9, a second embodiment of the present invention will be described.

Figure 7:
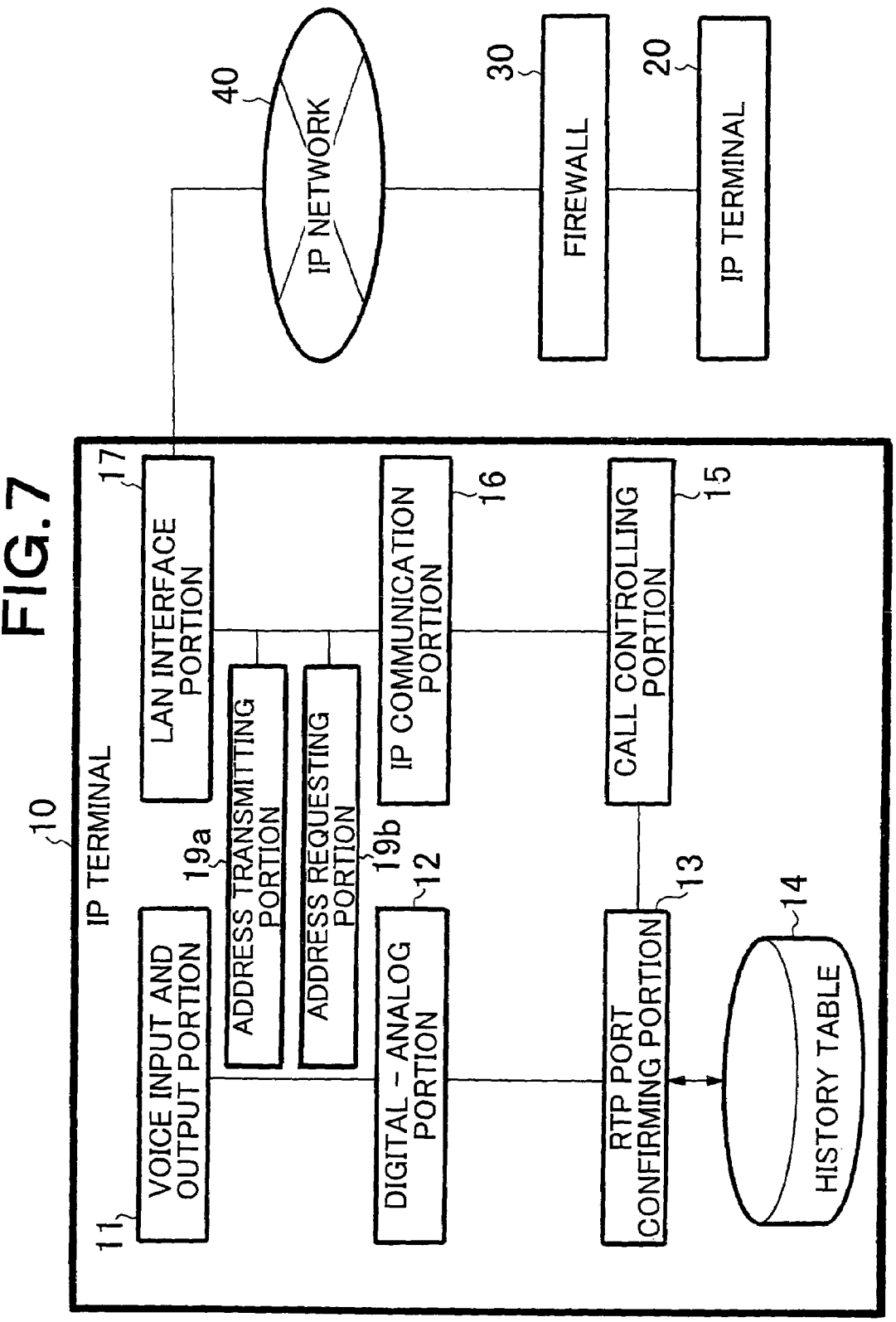
FIG. 7 is a schematic diagram showing the structure of an IP terminal that has an address transmitting portion and an address requesting portion.

FIG. 7 shows an example of the structure of an IP terminal according to the present embodiment. The IP terminal has an address transmitting portion 19a and an address requesting portion 19b. When a communication cannot be made through a known port, the address transmitting portion 19a transmits an IP address and a nickname of the IP terminal to a server, whereas the address requesting portion 19b transmits a called party's nickname to the server and requests from the server a called party's IP address and a port through which a communication can be made. A nickname is a name substituted for a proper name for example "monai@nec".

Figure 8:
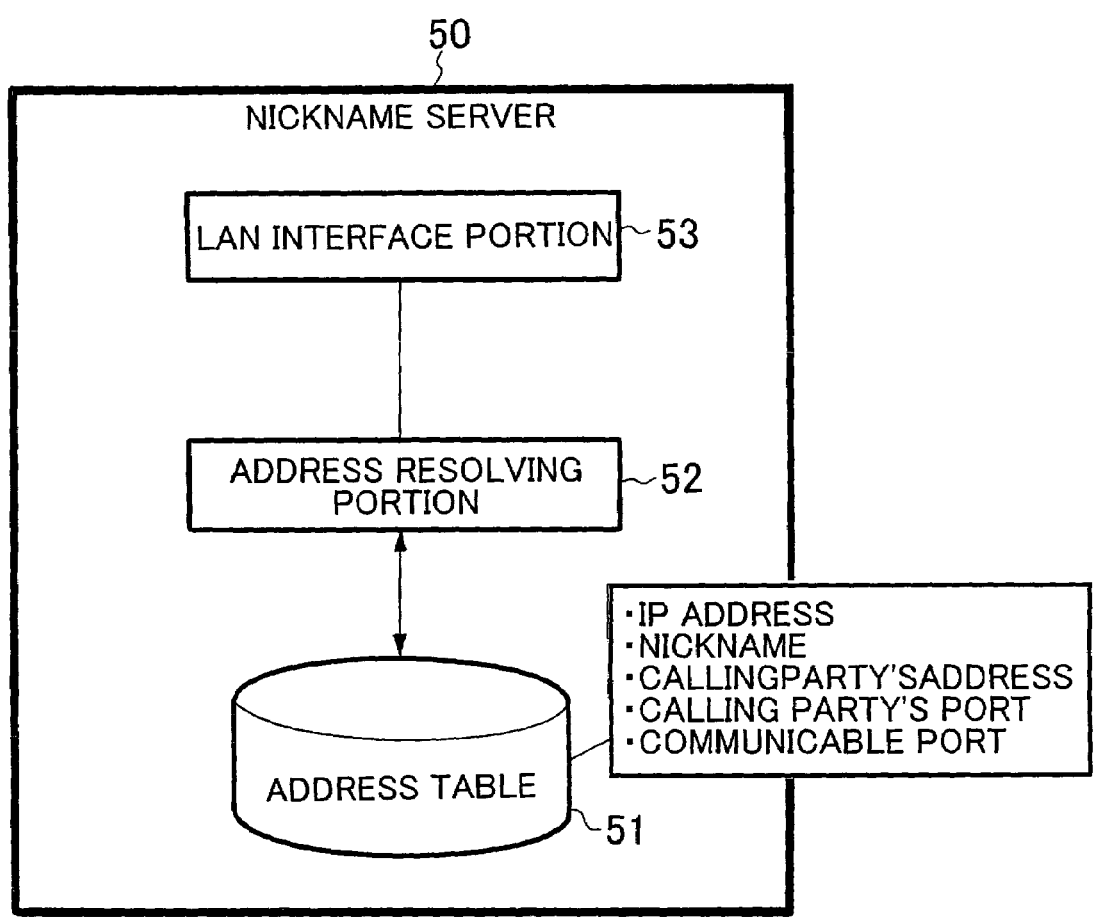
FIG. 8 is a schematic diagram showing the structure of a nickname server.

FIG. 8 shows an example of the structure of a nickname server. Nicknames, IP addresses, and communicable ports on the network are recorded on an address table 51. When the IP terminal 10 transmits a called party's nickname to a nickname server 50, an address resolving portion 52 of the nickname server performs a routing function for informing the IP terminal 10 of the called party's IP address and a port through which the IP terminal 10 can communicate with the called party. As a result, the IP terminal can transmit and receive voice data through the communicable port. With the nickname server, the user can access a called party without need to designate an object that is difficult to learn such as a telephone number or a URL.

Figure 9:
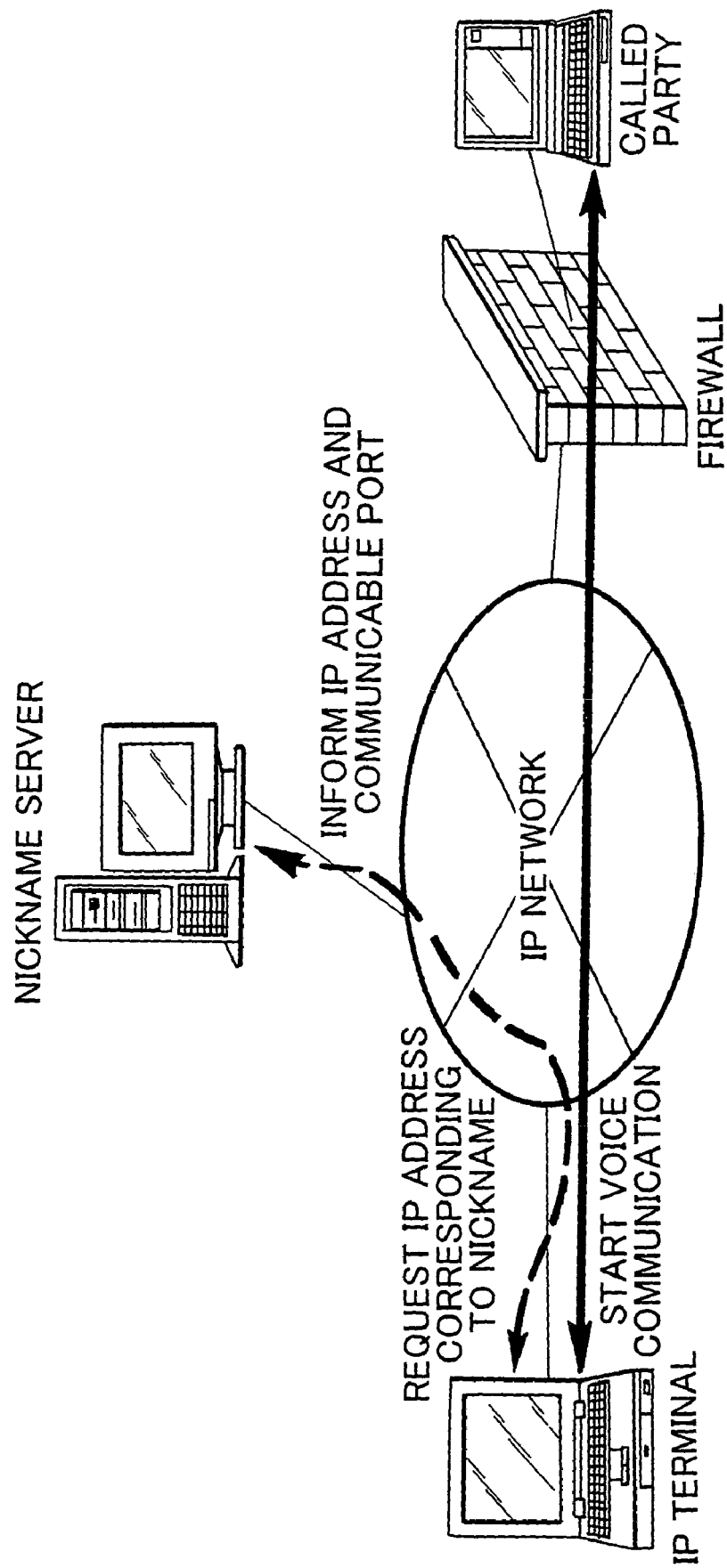
FIG. 9 is a schematic diagram showing a communication using the nickname server.

FIG. 9 is a schematic diagram showing a communication in the case that a nickname server is used. An IP terminal uses a communicable port for a called party's IP address of which the nickname server informed the IP terminal. As a result, the IP terminal can make a voice communication to a called party through a firewall.

FIG. 10 is a flow chart showing an operation in the case that the nickname server and the history table are used. First of all, voice is input to the voice input and output portion 11 (at S31). Thereafter, the digital-analog portion 12 converts analog signal of voice into digital data (at S32). Thereafter, a called party's nickname is transmitted to the nickname server so as to request a called party's IP address and a communicable port from the nickname server (at S33). Through a communicable port of which the calling party's IP terminal was informed, a communication is tried (at S34). At that point, with a search packet, it is confirmed whether or not a communication according to the RTP can be made. When the communication failed, the IP terminal determines a communication port using the own history table (at S35). A voice data communication is tried once again. With the past communication history and the communicable port of which the calling party's IP terminal was informed, a port through which voice data communication can be made is automatically determined (at S36). Digitized voice is sent to the call controlling portion 15. The call controlling portion 15 performs a call control for the voice communication (at S37). The voice data is sent to the IP communication portion 16. When a communication according to the RTP can be made, the voice data is packetized according thereto. When a communication according to the RTP cannot be made, the voice data is packetized according to a protocol corresponding to a communicable port (at S38). The packetized voice data according to the IP is sent to the LAN interface portion 17. The LAN interface portion 17 outputs the packetized voice data to the network (at S39).

As described above, a first effect of the present invention is in that with a firewall, it can be automatically determined whether or not voice data according to the RTP can be transmitted and received. This is because a search packet with which it is confirmed whether or not a communication can be made through a predetermined RTP port is sent and according to a response thereto it is determined whether or not the communication can be made.

A second effect of the present invention is in that even if a communication cannot be made through a known communication port, a port through which voice data can be transmitted and received is automatically determined. This is because an IP terminal references its own history table and automatically selects a data communication port to a called party.

A third effect is in that with a nickname server, when the user remembers a nickname of a called party, he or she can access the called party.

Although the present invention has been shown and described with respect to preferred embodiments thereof, it should be understood by those skilled in the art that the foregoing and various other changes, omissions, and additions in the form and detail thereof may be made therein without departing from the spirit and scope of the present invention.

What is claimed is:

1. A system for automatically selecting a voice data transmission and reception system for an IP network on which an IP terminal is connected to a called party's terminal through a firewall,
    wherein the IP terminal comprises:
    a call controlling portion for processing a VoIP (Voice over Internet Protocol) control signal;
    a voice input and output portion for inputting and outputting a voice and moving picture;
    a digital and analog process portion for performing a digital and analog converting process for the input voice and moving picture;
    an IP communication portion for transmitting the voice and moving picture according to the IP;
    an RTP port confirming portion for confirming whether or not a communication according to the RTP can be made; and
    a history table on which communications made through the firewall are recorded,
    wherein the RTP port confirming portion is configured to confirm whether or not the communication according to the RTP can be made,
    wherein when the communication according to the RTP can be made, an RTP port is used and voice data is sent to the IP communication portion so as to packetize the voice data for the communication according to the RTP, and
    wherein when the communication according to the RTP cannot be made, with reference to the history table, a port through which the voice data communication can be made is determined and the voice data is sent to the IP communication portion.

2. The system as set forth in claim 1,
    wherein the RTP port confirming portion is configured to send a search packet so as to confirm whether or not a communication can be made through a predetermined RTP port, and wherein when a response to the search packet is received, it is determined that the communication can be made and voice data according to the RTP is transmitted and received.

3. The system as set forth in claim 2,
wherein the RTP port confirming portion is configured to send a search packet so as to confirm whether or not a communication can be made through a known port,
wherein when a communication can be made through a known port, the port is assigned to a communication port and recorded in the history table,
wherein when a communication cannot be made through a known port and there are a plurality of records of the called party in the history table, a port through which a communication most recently succeeded is selected as a first candidate for communication port,
wherein when a communication cannot be made through the first candidate for communication port, a port through which a communication was most successfully made is selected as a communication port from the records of the history table.

4. The system as set forth in claim 1,
wherein the IP terminal further comprises:
an IP address confirming portion for confirming an IP address of the IP terminal and an IP address of the called party,
wherein when the IP terminal and the called party have private IP addresses, it is confirmed that the IP terminal and the called party's terminal are on the same network, and voice data according to the RTP are transmitted and received.

5. The system as set forth in claim 1, further comprising:
a nickname server for recording nicknames, IP addresses, and communicable ports on the network in an address table,
wherein the IP terminal further comprises:
an address transmitting portion for transmitting an IP address and a nickname of the IP terminal to the nickname server; and
an address requesting portion for transmitting a nickname of the called party to the nickname server and requesting an IP address of the called party from the nickname server,
wherein when the IP terminal transmits the nickname of the called party to the nickname server and requests the address of the called party from the nickname server, the nickname server informs the IP terminal of the IP address of the called party and a communicable port, and
wherein the IP terminal is configured to transmit and receive the voice data through the communicable port.

6. The system as set forth in claim 5,
wherein the IP terminal further comprises:
means for trying to make a voice data communication through a communicable port of which the nickname server informed the IP terminal, determining a communication port with the history table of the IP terminal when the communication failed, and trying to make the voice data communication again, and
wherein with the past communication history and port information of the nickname server, a port through which a voice data communication can be made is automatically determined.

7. A method for automatically selecting a voice data transmission and reception system for an IP terminal connected to a called party's terminal through an IP network and a firewall, the method comprising the steps of:

confirming whether or not a communication according to a RTP can be made, when the IP terminal transmits voice and moving picture data according to an IP;
using a RTP port and sending the voice data to an IP communication portion of the IP terminal so as to packetize the voice data for the communication according to the RTP, when the communication according to the RTP can be performed; and
determining a port through which a voice data communication can be made with reference to a history table in which data communications made through the firewall are recorded, sending the voice data to the IP communication portion, and packetizing the voice data, when the communication according to the RTP cannot be made,
wherein the steps are carried out on the IP terminal.

8. The method as set forth in claim 7, further comprising the steps of:
sending a search packet so as to confirm whether or not a communication can be made through a predetermined RTP port; and
determining that the communication can be made and transmitting and receiving the voice data according to the RTP, when a response to the search packet is received.

9. An IP terminal for automatically selecting a voice data transmission and reception system, the IP terminal being connected to a called party's terminal through an IP network and a firewall, the IP terminal comprises:
a call controlling portion for processing a VoIP control signal;
a voice input and output portion for inputting and outputting voice and a moving picture;
a digital and analog process portion for performing a digital and analog converting process for the input voice and moving picture;
an IP communication portion for transmitting the voice and moving picture according to the IP;
an RTP port confirming portion for confirming whether or not a communication according to the RTP can be made; and
a history table on which communications that were made through the firewall are recorded,
wherein the RTP port confirming portion is configured to confirm whether or not the communication according to the RTP can be made,
wherein when the communication according to the RTP can be made, an RTP port is used and voice data is sent to the IP communication portion so as to packetize the voice data for the communication according to the RTP, and
wherein when the communication according to the RTP cannot be made, with reference to the history table, a port through which the voice data communication can be made is determined and the voice data is sent to the IP communication portion.

10. The IP terminal as set forth in claim 9,
wherein the RTP port confirming portion is configured to send a search packet so as to confirm whether or not a communication can be made through a predetermined RTP port, and
wherein when a response to the search packet is received, it is determined that the communication can be made and voice data according to the RTP is transmitted and received.

* * * * *